US012574837B2

(12) United States Patent
Höglund et al.

(10) Patent No.: US 12,574,837 B2
(45) Date of Patent: Mar. 10, 2026

(54) CELL SELECTION WITH COVERAGE RECOVERY FOR REDUCED CAPABILITY USER EQUIPMENT

(71) Applicant: Telefonaktiebolaget LM Ericsson (publ), Stockholm (SE)

(72) Inventors: Andreas Höglund, Solna (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 18/016,778

(22) PCT Filed: Jun. 29, 2021

(86) PCT No.: PCT/SE2021/050650
§ 371 (c)(1),
(2) Date: Jan. 18, 2023

(87) PCT Pub. No.: WO2022/019817
PCT Pub. Date: Jan. 27, 2022

(65) Prior Publication Data
US 2023/0284131 A1      Sep. 7, 2023

Related U.S. Application Data

(60) Provisional application No. 63/053,772, filed on Jul. 20, 2020.

(51) Int. Cl.
*H04W 48/20*          (2009.01)
(52) U.S. Cl.
CPC .................................... *H04W 48/20* (2013.01)

(58) Field of Classification Search
None
See application file for complete search history.

(56) References Cited

U.S. PATENT DOCUMENTS 10,341,916 B2 *    7/2019   Futaki ................. H04W 36/165
2014/0098761 A1    4/2014   Lee et al.
(Continued)

FOREIGN PATENT DOCUMENTS

WO          2014179987 A1    11/2014
WO          2021030150 A1     2/2021

OTHER PUBLICATIONS

3GPP, "3rd Generation Partnership Project; Technical Specification Group Core Network and Terminals; Non-Access-Stratum (NAS) functions related to Mobile Station (MS) in idle mode (Release 16)", 3GPP TS 23.122 V16.5.0, Mar. 2020, 1-80.
(Continued)

*Primary Examiner* — Hong S Cho
(74) *Attorney, Agent, or Firm* — Murphy, Bilak & Homiller, PLLC

(57) ABSTRACT

According to an aspect of the disclosure, there is provided a method performed by a first wireless device for cell selection. The method comprises evaluating (1302) a cell selection criterion to select a cell for use by the first wireless device, wherein the cell selection criterion provides for a RedCap threshold value and/or a RedCap threshold offset for providing coverage recovery for RedCap wireless devices, wherein a RedCap wireless device is a wireless device that has reduced capability.

18 Claims, 14 Drawing Sheets

Provide a RedCap threshold value and/or a RedCap threshold offset for providing coverage recovery for RedCap wireless devices that are evaluating a cell selection criterion

1402

(56)         References Cited

U.S. PATENT DOCUMENTS

| | | | | |
|---|---|---|---|---|
| 2018/0160346 A1* | 6/2018 | Lee | .................. | H04W 36/08 |
| 2018/0324866 A1* | 11/2018 | Lee | .................. | H04W 48/02 |
| 2019/0246325 A1* | 8/2019 | Lee | .................. | H04W 36/08 |
| 2021/0352569 A1* | 11/2021 | Koskinen | .............. | H04W 12/60 |

OTHER PUBLICATIONS

3GPP , "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

3GPP , "3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304 V16.0.0, Mar. 2020, 1-58.

3GPP , "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

3GPP , "3rd Generation Partnership Project; Technical Specification Group Radio Access Network; NR; User Equipment (UE) procedures in Idle mode and RRC Inactive state (Release 16)", 3GPP TS 38.304 V16.0.0, Mar. 2020, 1-38.

Denso Corporation , "Camping restriction and cell selection criterion", 3GPP TSG-RAN WG2 #114-e, R2-2105443, Resubmission of R2-2102947, Online, May 19-27, 2021, 1-3.

Huawei , et al., "Further views on Rel-17 NR Light work area", 3GPP TSG RAN Meeting #85, RP-191832, Newport Beach, USA, Sep. 16-20, 2019, 1-5.

Huawei , et al., "Other aspects for reduced capability devices", 3GPP TSG RAN WG1 Meeting #101-e, R1-2004612, E-meeting, May 25-Jun. 5, 2020, 1-6.

* cited by examiner

BEGIN

1010
Host computer
provides user
data

1020
Host computer
initiates
transmission
carrying the
user data to the
UE

1030
UE receives the
user data

END

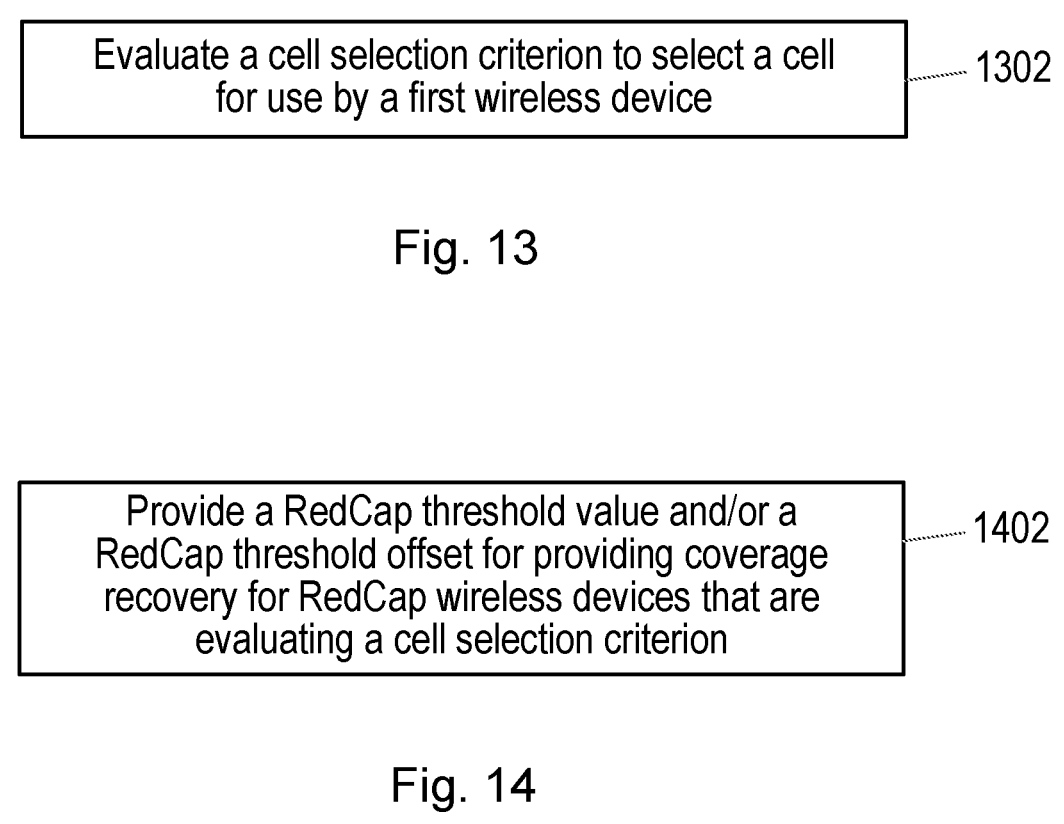

Evaluate a cell selection criterion to select a cell for use by a first wireless device ⸺ 1302

Fig. 13

Provide a RedCap threshold value and/or a RedCap threshold offset for providing coverage recovery for RedCap wireless devices that are evaluating a cell selection criterion ⸺ 1402

Fig. 14

CELL SELECTION WITH COVERAGE RECOVERY FOR REDUCED CAPABILITY USER EQUIPMENT

TECHNICAL FIELD

This disclosure relates to the field of telecommunication networks, and in particular to wireless devices that have a reduced capability.

BACKGROUND

Generally, all terms used herein are to be interpreted according to their ordinary meaning in the relevant technical field, unless a different meaning is clearly given and/or is to implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

5G is the fifth generation of cellular technology and was introduced in Release 15 (Rel-15) of the Third Generation Partnership Project (3GPP) standard. It is designed to increase speed, reduce latency, and improve flexibility of wireless services. The 5G system (5GS) includes both a new radio access network (NG-RAN) which makes use of a new air interface called New Radio (NR), and a new core network (5GC).

The initial release of 5G in Release 15 is optimised for mobile broadband (MBB) and ultra-reliable and low latency communication (URLLC). These services require very high data rates and/or low latency and therefore put high requirements on the User Equipment (UE). To enable 5G to be used for other services with more relaxed performance requirements, a new low complexity UE type is to be introduced in Release 17 (see 3GPP TS 38.331 Radio Resource Control (RRC) protocol specification). The low complexity UE type can have reduced capabilities compared to a 'regular' UE type, and so is sometimes referred to as an 'NR RedCap [reduced capability] UE'. The NR RedCap UE type is intended to be particularly suited to machine type communication (MTC) services such as wireless sensors or video surveillance, but it can also be used for MBB services with lower performance requirements, such as wearables (e.g. watches, health monitoring devices, etc.). The low complexity UE can have reduced capabilities compared to a Release 15 NR UE, for instance: reduced UE bandwidth, a reduced number of UE receiving (RX)/transmitting (TX) antennas, half duplex frequency division duplex (FDD), relaxed UE processing time, and/or relaxed UE processing capability. An NR RedCap UE may have some or all the reduced capabilities above.

The work in 3GPP in still ongoing to fully define the 'RedCap UE' type. The new lower UE capabilities to be introduced in Release 17 will be limited to use by RedCap UEs, i.e. they will not be allowed to be used by non-RedCap UEs. A RedCap UE will have 20 MHz device bandwidth in Frequency Range 1 (FR1), whereas non-RedCap UEs must in principle support at least 100 MHz (and similarly with 100 MHz vs 200 MHz in Frequency Range 2 (FR2)). In addition, RedCap UEs will not support 'dual connectivity' or 'carrier aggregation'. RedCap UEs may optionally support fewer receiver (RX) branches, e.g. 1 or 2, compared to non-RedCap UEs.

From the network operator side it is important that the low complexity UEs are only used for their intended use cases. To enforce this requirement, the network must be able to identify the low complexity UEs and be able to restrict their access when necessary. This aim is captured in a 3GPP study item description for the low complexity UE as:

"Study standardization framework and principles for how to define and constrain such reduced capabilities—considering definition of a limited set of one or more device types and considering how to ensure those device types are only used for the intended use cases.

Study functionality that will allow devices with reduced capabilities to be explicitly identifiable to networks and network operators, and allow operators to restrict their access, if desired."

A reason why network operators may want to restrict the access of RedCap UE to their networks is the negative impact on the network performance that RedCap UEs can cause. That is, UEs with reduced bandwidth, and more importantly fewer receiving antennas, e.g. 1 Rx, do not perform as well and may come to consume more network resources than regular UEs. For example, cell coverage for such RedCap UEs may be reduced and would have to be compensated by, e.g., using more time repetitions, higher transmit power, etc. This is covered in the study item description by the following objective:

"Study functionality that will enable the performance degradation of such complexity reduction to be mitigated or limited, including [RAN1]:

Coverage recovery to compensate for potential coverage reduction due to the device complexity reduction."

In Release 13 (Rel-13), Long Term Evolution-MTC (LTE-M) introduced lower complexity MTC devices for LTE, UE category M devices. Unlike for RedCap, this feature targeted a low-power wide-area (LPWA) use case for which coverage extension is required to reach, e.g., sensors in basements. A 20 decibel (dB) coverage enhancement and support for and up to 164 dB maximum coupling loss (MCL) were introduced. Several companies want to ensure that RedCap doesn't also address the LPWA use case, since both LTE-M and Narrowband (NB)-Internet of Things (IoT) already target this use case. Therefore, the RedCap study item description contains the following note:

"Note1: The work defined above should not overlap with LPWA use cases."

The coverage enhancements of LTE-M, and NB-IoT, which were also introduced in Rel-13, rely on time repetition, relaxed acquisition time, and lower data rates for physical channels (some physical channels are also omitted). For these enhancements to be useful, UEs must also effectively "see" a larger cell when selecting the cell to camp on. That is, enhancements are also required for the Cell Selection procedure. Without these enhancements, there is little point in supporting 2048 repetitions on a physical downlink shared channel (PDSCH) if UEs will only select the cell when in normal coverage.

FIG. 1 is a schematic illustration of coverage enhancement (CE) for a cell. A base station (known as a gNB in 5G NR) has a 'normal' coverage area in which regular UEs typically have coverage from the base station. Coverage enhancement (CE) effectively extends the cell to enable a UE to have coverage while located further from the base station.

To achieve this, for LTE-M the Cell Selection criterion in 3GPP TS 36.304 ("Evolved Universal Terrestrial Radio Access (E-UTRA); User Equipment (UE) procedures in idle mode") was modified to the following:

5.2.3.2 Cell Selection Criterion

For NB-IoT the cell selection criterion is defined in clause 5.2.3.2a.
The cell selection criterion S in normal coverage is fulfilled when:

Srxlev > 0 AND Squal > 0 where:

$$Srxlev = Q_{rxlevmeas} - (Q_{rxlevmin} + Q_{rxlevminoffset}) - Pcompensation - Qoffset_{temp}$$
$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 36.331 [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN TS 23.122 [5] |
| $Q_{qualminoffset}$ | Offset to the signalled $Q_{qualmin}$ taken into account in the Squal evaluation as a result of a periodic search for a higher priority PLMN while camped normally in a VPLMN TS 23.122 [5] |
| Pcompensation | If the UE supports the additionalPmax in the NS-PmaxList, if present, in SIB1, SIB3 and SIB5:<br>$max(P_{EMAX1} - P_{PowerClass}, 0) - (min(P_{EMAX2}, P_{PowerClass}) - min(P_{EMAX1}, P_{PowerClass}))$ (dB);<br>else:<br>if $P_{PowerClass}$ is 14 dBm:<br>$max(P_{EMAX1} - (P_{PowerClass} - Poffset), 0)$ (dB);<br>else:<br>$max(P_{EMAX1} - P_{PowerClass}, 0)$ (dB) |
| $P_{EMAX1}, P_{EMAX2}$ | Maximum TX power level an UE may use when transmitting on the uplink in the cell (dBm) defined as $P_{EMAX}$ in TS 36.101 [33]. $P_{EMAX1}$ and $P_{EMAX2}$ are obtained from the p-Max and the NS-PmaxList respectively in SIB1, SIB3 and SIB5 as specified in TS 36.331 [3]. |
| $P_{PowerClass}$ | Maximum RF output power of the UE (dBm) according to the UE power class as defined in TS 36.101 [33] |

The signalled values $Q_{rxlevminoffset}$ and $Q_{qualminoffset}$ are only applied when a cell is evaluated for cell selection as a result of a periodic search for a higher priority PLMN while camped normally in a VPLMN TS 23.122 [5]. During this periodic search for higher priority PLMN the UE may check the S criteria of a cell using parameter values stored from a different cell of this higher priority PLMN.
If cell selection criterion S in normal coverage is not fulfilled for a cell, UE shall consider itself to be in enhanced coverage if the cell selection criterion S for enhanced coverage is fulfilled, where:

| | |
|---|---|
| $Q_{rxlevmin}$ | UE applies coverage specific value $Q_{rxlevmin\_CE}$ (dBm) |
| $Q_{qualmin}$ | UE applies coverage specific value $Q_{qualmin\_CE}$ (dB) |

If cell selection criteria S in normal coverage is fulfilled for a cell, UE [may] consider itself to be in enhanced coverage if SystemInformationBlockType1 cannot be acquired but UE is able to acquire MasterInformationBlock, SystemInformationBlockType1-BR and SystemInformationBlockType2.
If cell selection criterion S in normal coverage is not fulfilled for a cell and UE does not consider itself in enhanced coverage based on coverage specific values $Q_{rxlevmin\_CE}$ and $Q_{qualmin\_CE}$, UE shall consider itself to be in enhanced coverage if UE supports CE Mode B and CE mode B is not restricted by upper layers and the cell selection criterion S for enhanced coverage is fulfilled, where:

| | |
|---|---|
| $Q_{rxlevmin}$ | UE applies coverage specific value $Q_{rxlevmin\_CE1}$ (dBm) |
| $Q_{qualmin}$ | UE applies coverage specific value $Q_{qualmin\_CE1}$ (dB) |

For the UE in enhanced coverage, coverage specific values $Q_{rxlevmin\_CE}$ and $Q_{qualmin\_CE}$ (or $Q_{rxlevmin\_CE1}$ and $Q_{qualmin\_CE1}$) are only applied for the suitability check in enhanced coverage (i.e. not used for measurement and reselection thresholds).

In short, if a UE capable of coverage enhancements does not fulfil the S criterion for camping in normal coverage, using $Q_{rxlevmin}$ and $Q_{qualmin}$, it should consider itself to be in enhanced coverage if the S criterion is fulfilled using the CE thresholds $Q_{rxlevmin\_CE}$ and $Q_{qualmin\_CE}$. If the S criterion is still not fulfilled, then the UE considers itself out of coverage.

The addition using coverage enhancement is perhaps more apparent from the Rel-13 Change Request (CR) submitted to RAN plenary for approval at the end of the release using Track Changes (colour coding). Note that, compared to the above specification text, some more functionality and some other modifications were added later (e.g. that $Q_{rxlevmin\_CE}$ indicates the to coverage of CE mode A, and that $Q_{rxlevmin\_CE1}$ indicates the coverage of CE mode B).

---

5.2.3.2 Cell Selection Criterion

The cell selection criterion S in normal coverage is fulfilled when:

Srxlev > 0 AND Squal > 0 where:

$Srxlev = Q_{rxlevmeas} - (Q_{rxlevmin} + Q_{rxlevminoffset}) - Pcompensation - Qoffset_{temp}$ $Squal = Q_{qualmeas} - (Q_{qualmin} + Q_{qualminoffset}) - Qoffset_{temp}$ where:

| | |
|---|---|
| Srxlev | Cell selection RX level value (dB) |
| Squal | Cell selection quality value (dB) |
| $Qoffset_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The signalled values $Q_{rxlevminoffset}$ and $Q_{qualminoffset}$ are only applied when a cell is evaluated for cell selection as a result of a periodic search for a higher priority PLMN while camped normally in a VPLMN [5]. During this periodic search for higher priority PLMN the UE may check the S criteria of a cell using parameter values stored from a different cell of this higher priority PLMN.

If cell selection criterion S in normal coverage is not fulfilled for a cell, UE shall consider itself to be in enhanced coverage if the cell selection criterion S for enhanced coverage is fulfilled, where:

| | |
|---|---|
| $Q_{rxlevmin}$ | UE applies coverage specific value $Q_{rxlevmin\_CE}$ (dBm) |
| $Q_{qualmin}$ | UE applies coverage specific value $Q_{qualmin\_CE}$ (dB) |

For the UE in enhanced coverage, coverage specific values $Q_{rxlevmin\_CE}$ and $Q_{qualmin\_CE}$ are only applied for the suitability check in enhanced coverage (i.e. not used for measurement and reselection thresholds).

These parameters are configured by the IE cellSelection-InfoCE in the RRC specification 3GPP TS 36.331. This IE includes the parameters: RxLevMinCE, which corresponds to parameter $Q_{rxlevminCE}$ in 36.304, and q-QualMinRSRO-CE, which corresponds to parameter $Q_{qualminCE}$ in 36.304. If q-QualMinRSRO-CE is not present, the UE applies the (default) value of negative infinity for $Q_{qualm}$.

SUMMARY

There currently exist certain challenge(s). In particular, using a similar Cell Selection criterion modification as for LTE-M, the coverage recovery for NR RedCap UEs would in practice be coverage enhancement for more capable (higher complexity/regular) UEs. This is a problem to since large coverage enhancement that is used for LPWA use cases is not desired according to the RedCap Study Item Description (SID).

Certain aspects of the present disclosure and their embodiments may provide solutions to these or other challenges. The solution aims to ensure the coverage compensation introduced as part of Release 17 (Rel-17) for RedCap UEs is in fact a compensation up to the Rel-15 coverage limit, and that it cannot be misused by higher complexity UEs to effectively achieve a coverage enhancement. This disclosure provides both explicit and implicit ways of configuring the coverage recovery, the latter e.g. based on the performance loss and difference in Reference Symbol/Signal Received Power (RSRP) or Reference Symbol/Signal Received Quality (RSRQ) associated with the UE complexity reduction. The solution differentiates to between coverage enhancement and coverage recovery to ensure that the introduction of RedCap UEs does not result in a large coverage enhancement that is used for LPWA use cases, which is not desired according to the RedCap SID.

There are, proposed herein, various embodiments which address one or more of the issues disclosed herein.

According to a first aspect, there is provided a method performed by a first wireless device for cell selection. The method comprises evaluating a cell selection criterion to select a cell for use by the first wireless device, wherein the cell selection criterion provides for a RedCap threshold value and/or a RedCap threshold offset for providing coverage recovery for RedCap wireless devices, wherein a RedCap wireless device is a wireless device that has reduced capability.

According to a second aspect, there is provided a method performed by a first base station for controlling coverage recovery in a first cell. The method comprises providing a RedCap threshold value and/or a RedCap threshold offset for providing coverage recovery for RedCap wireless devices that are evaluating a cell selection criterion, wherein a RedCap wireless device is a wireless device that has reduced capability.

According to a third aspect, there is provided a computer program product comprising a computer readable medium having computer readable code embodied therein. The computer readable code is configured such that, on execution by a suitable computer or processor, the computer or processor is caused to perform the method according to the first aspect, the second aspect, or any embodiments thereof.

According to a fourth aspect, there is provided a first wireless device configured to perform cell selection. The first wireless device is configured to evaluate a cell selection criterion to select a cell for use by the first wireless device (410; 500), wherein the cell selection criterion provides for a RedCap threshold value and/or a RedCap threshold offset for providing coverage recovery for RedCap wireless devices, wherein a RedCap wireless device is a wireless device that has reduced capability.

According to a fifth aspect, there is provided a first base station configured to control coverage recovery in a first cell. The first base station configured to provide a RedCap threshold value and/or a RedCap threshold offset for providing coverage recovery for RedCap wireless devices that are evaluating a cell selection criterion, wherein a RedCap wireless device is a to wireless device that has reduced capability.

According to a sixth aspect, there is provided a first wireless device configured to perform cell selection. The first wireless device comprises a processor and a memory, the memory containing instructions executable by said processor whereby said first wireless device is operative to evaluate a cell selection criterion to select a cell for use by the first wireless device, wherein the cell selection criterion provides for a RedCap threshold value and/or a RedCap threshold offset for providing coverage recovery for RedCap wireless devices, wherein a RedCap wireless device is a wireless device that has reduced capability.

According to a seventh aspect, there is provided a first base station configured to control coverage recovery in a first cell. The first base station comprises a processor and a memory, said memory containing instructions executable by said processor whereby said first base station is operative to: provide a RedCap threshold value and/or a RedCap threshold offset for providing coverage recovery for RedCap wireless devices that are evaluating a cell selection criterion, wherein a RedCap wireless device is a wireless device that has reduced capability.

Certain embodiments may provide one or more of the following technical advantage(s). In particular, certain embodiments provide a mechanism to ensure that coverage recovery is provided for RedCap UEs, and not coverage enhancement. This means that the feature is used what it is intended for, and not to provide coverage enhancements for higher complexity UEs. Also, embodiments of the solution introduce an implicit mechanism to restore coverage up to the Rel-15 limit, but not more.

BRIEF DESCRIPTION OF THE DRAWINGS

Some of the embodiments contemplated herein will now be described more fully with reference to the accompanying drawings, in which:

FIG. 13 shows a method performed by a first wireless device in accordance with particular embodiments;

FIG. 14 shows a method performed by a first base station in accordance with particular embodiments;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Basic Operation

The basic functionality of the techniques described herein is that, for RedCap UEs, when the S criterion of cell camping in normal coverage is not fulfilled with the legacy thresholds $Q_{rxlevmin}$ and $Q_{qualmin}$, but it is fulfilled with new lower and RedCap-specific thresholds, $Q_{rxlevmin\_RedCap}$ and $Q_{qualmin\_RedCap}$, the UE considers itself to be in 'coverage recovery'. This is similar to LTE-M UEs. This basic functionality is illustrated in FIG. 2, which is a schematic illustration of use of a coverage recovery threshold for cell selection.

Figure 1:
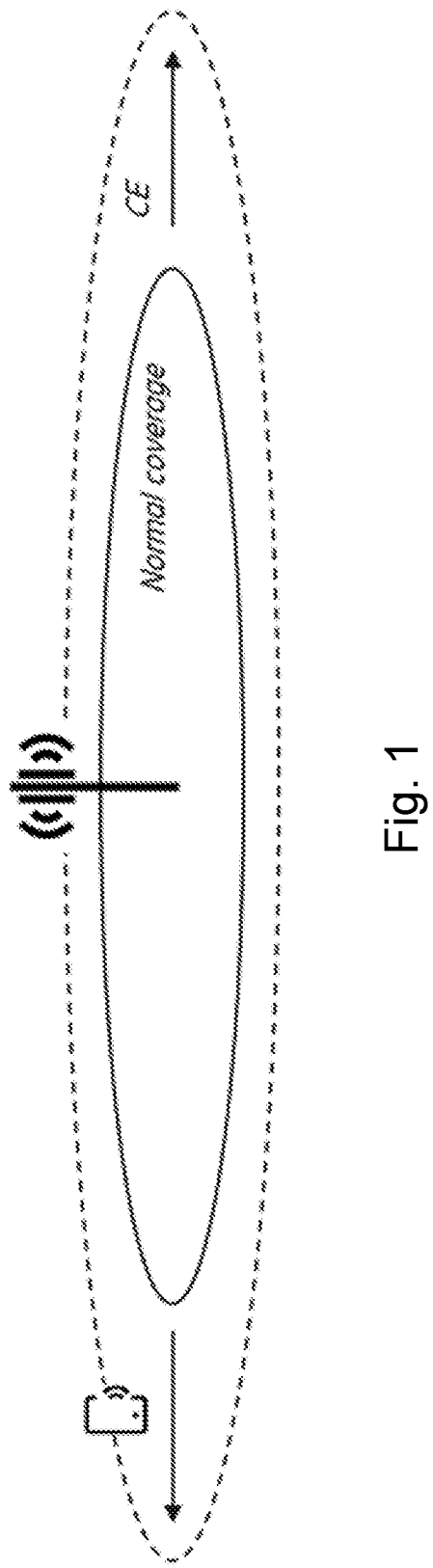
FIG. 1 is a schematic illustration of coverage enhancement (CE) for a cell.
Figure 2:
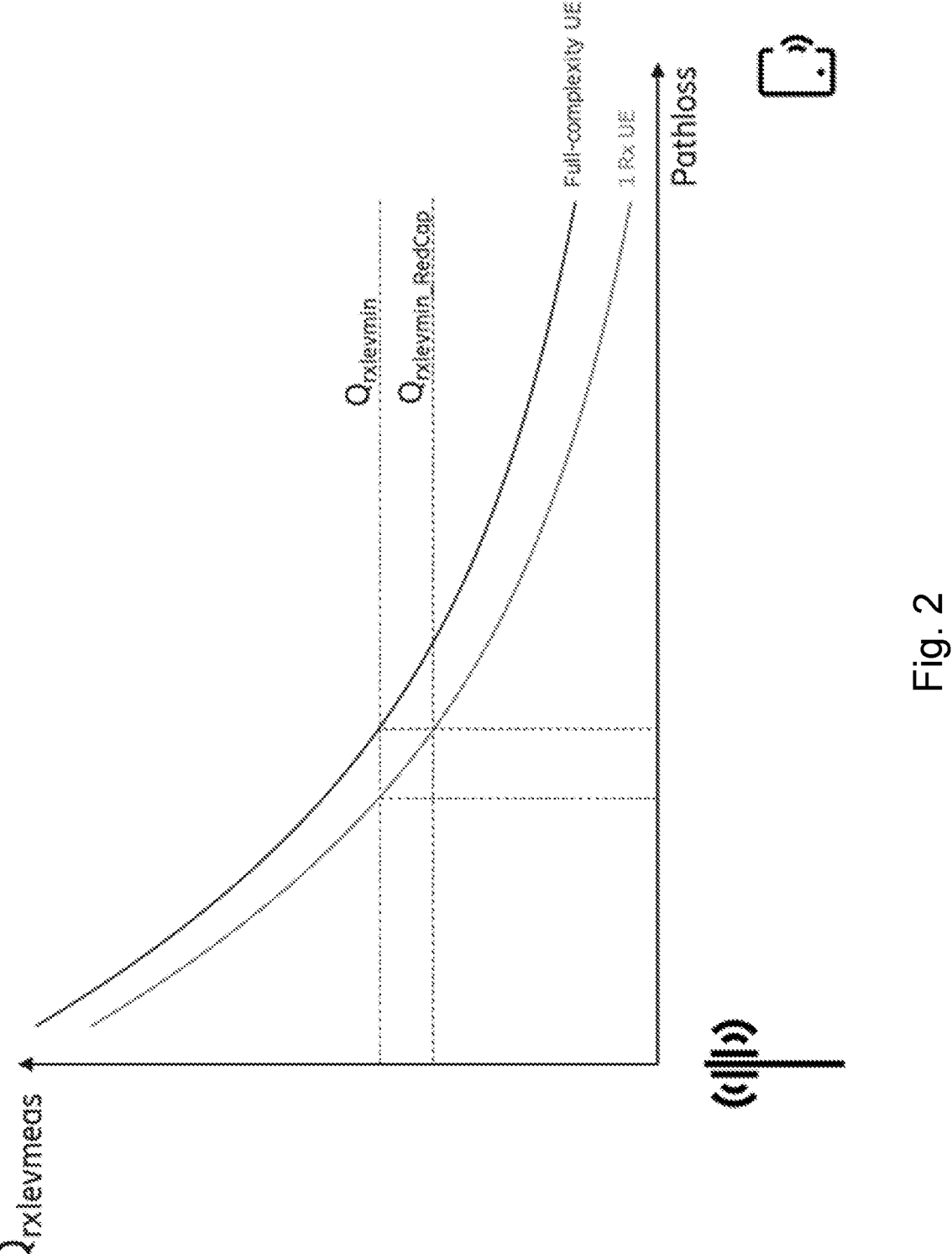
FIG. 2 is a schematic illustration of use of a coverage recovery threshold for cell selection.

Thus in FIG. 2 a full complexity UE uses a threshold $Q_{rxlevmin}$ (the minimum required RX level in the cell (dBm)), which gives a certain coverage from the base station, and a low complexity/RedCap UE (e.g. with just one receiver) can use a threshold $Q_{rxlevmin\_RedCap}$ that is lower than the threshold for full complexity UEs/non-RedCap UEs. The value of the threshold $Q_{rxlevmin\_RedCap}$ is lower by an amount that enables the same, or approximately the same, amount of coverage from the base station for a RedCap UE as for the full complexity UE.

The S criterion for cell selection can be similar to, or as shown earlier in, the extract of section 5.2.3.2 of 3GPP TS 36.304, or similar to, or as shown in, section 5.2.3.2 of 3GPP TS 38.304.

As noted above, a RedCap UE will have 20 MHz device bandwidth in FR1, whereas non-RedCap UEs must in principle support at least 100 MHz. Similarly, in FR2 a RedCap UE will have 100 MHz bandwidth compared to 200 MHz for a non-RedCap UE. In addition, RedCap UEs will not support 'dual connectivity' or 'carrier aggregation'. RedCap UEs may optionally support fewer receiver (RX) branches, e.g. 1 or 2, compared to non-RedCap UEs.

Thus a RedCap UE can be a UE that is configured to operate in a 5G network with only a 20 MHz bandwidth in FR1 and a 100 MHZ bandwidth in FR2.

Restrictions of Use

In a first set of embodiments of the techniques presented herein, the use of the RedCap-specific thresholds to achieve coverage recovery is restricted so that only appropriate UEs can use them. Thus, it is controlled which UEs are allowed to apply the lower thresholds for cell selection, i.e. $Q_{rxlevmin\_RedCap}$ and $Q_{qualmin\_RedCap}$. The network and/or UE can determine whether a particular UE is allowed to apply the lower threshold for cell selection based on any one or more of the following:

the UE capability/capabilities, for example the number of antennas available or used for transmitting and/or receiving, e.g. "1 Rx antenna", and/or for example a device (UE) bandwidth, e.g. support of max 20 MHz in frequency range 1 (FR1), 50 MHz in frequency range 2 (FR2);

a UE type, for example a 'RedCap' UE category or set of UE capabilities (e.g. a UE type that is defined by a UE having a particular set of capabilities);

part of UE subscription information for the UE, for example it can be determined for the UE's subscription profile identification (SPID) if the UE is allowed to use coverage recovery or not.

Thus, a UE would need to meet one or more conditions as a prerequisite for the UE to be allowed to apply the lower thresholds for cell selection and to extend the normal coverage by considering itself to be in 'coverage recovery'. For example a UE may be required to only have one receiving antenna to be allowed to apply the lower thresholds, etc. In this way, high-complexity UEs would be not be allowed to use coverage recovery but would be restricted to normal coverage.

Any condition that is to be satisfied in order for a UE to be able to use the lower thresholds for coverage recovery can be added as a requirement in the relevant standard, e.g. as a condition in section 5.2.3.2 of 3GPP TS 38.304. For example, a possible amendment to section 5.2.3.2 is shown below (where underlined text indicates additions) where "and coverage recovery is supported by the UE" has been added:

---

5.2.3.2 Cell Selection Criterion

The cell selection criterion S is fulfilled when:
  Srxlev > 0 AND Squal > 0
where:
  Srxlev = $Q_{rxlevmeas} - (Q_{rxlevmin} + Q_{rxlevminoffset})$ − Pcompensation − $Qoffset_{temp}$
  Squal = $Q_{qualmeas} - (Q_{qualmin} + Q_{qualminoffset})$ − $Qoffset_{temp}$
...
If cell selection criterion S in normal coverage is not fulfilled for a cell, UE shall consider itself to be in coverage recovery if the cell selection criterion S for -continued

| 5.2.3.2 Cell Selection Criterion |
| --- | enhanced coverage is fulfilled and coverage recovery is supported by the UE. where:

| | |
| --- | --- |
| $Q_{rxlevmin}$ | UE applies coverage recovery specific value $Q_{rxlevmin\ RedCap}$ (dBm) |
| $Q_{qualmin}$ | UE applies coverage recovery specific value $Q_{qualmin\ RedCap}$ (dB) |

As an alternative implementation of the above principle (but with the same effect), $Q_{rxlevmin\_RedCapOffset}$ and $Q_{qualmin\_RedCapOffset}$ can be added to the legacy cell selection S criterion but defined to be 0 dB for anything except RedCap UEs. That is, this could be implemented as two offsets in the Cell Selection Criteria formulas in Section 5.2.3.2 of 3GPP TS 38.304. An example using $Q_{rxlevmin\_RedCapOffset}$ and $Q_{qualmin\_RedcapOffset}$ to represent these two new offsets is as follows:

| 5.2.3.2 Cell Selection Criterion |
| --- |

The cell selection criterion S is fulfilled when:
   Srxlev > 0 AND Squal > 0
where:
   $Srxlev = Q_{rxlevmeas} - (Q_{rxlevmin} + Q_{rxlevmin\_RedCapOffset} + Q_{rxlevminoffset})$
     $- P_{compensation} - Qoffset_{temp}$
   $Squal = Q_{qualmeas} - (Q_{qualmin} + Q_{qualmin\_RedCapOffset} + Q_{qualminoffset}) - Qoffset_{temp}$
where:

| | |
| --- | --- |
| $Q_{rxlevmin\_RedCapoffset}$ | Offset to the signalled $Q_{rxlevmin}$ taken into account in the Srxlev evaluation to give coverage recovery for RedCap UEs. Set to 0 dB for non RedCap UEs |
| $Q_{qualmin\_RedCapOffset}$ | Offset to the signalled $Q_{qualmin}$ taken into account in the Squal evaluation to give coverage recovery for RedCap UEs. Set to 0 dB for non RedCap UEs |

The following section discusses embodiments relating to the amount of Coverage Recovery.

Explicit Configuration

In a second set of embodiments of the techniques presented herein (which can be implemented in combination with, or separately from, the first set of embodiments described above), the amount of coverage recovery is explicitly configured for a particular UE. Thus, the amount of coverage recovery allowed is configurable, and can be different for different UEs. The amount of coverage recovery would essentially be the difference between $Q_{rxlevmin\_RedCap}$ and $Q_{qualmin\_RedCap}$ and their respective legacy values $Q_{rxlevmin}$ and $Q_{qualmin}$. This means that a difference of '0 dB' would mean that only 'normal coverage' would be allowed for the UE, and, e.g., a difference of '3 dB' would mean that the UE has 3 dB coverage recovery, or the UE has extended coverage compared to normal coverage. In the case of the alternative implementation of the first set of embodiments where RedCap offsets are added to the cell selection S criterion, the amount of the offsets $Q_{rxlevmin\_RedCapOffset}$ and $Q_{qualmin\_RedCapOffset}$ determine the amount of coverage recovery, with an offset of 0 db indicating normal coverage.

For example, the amount of coverage recovery could be dependent on any of the following characteristics of the UE (the examples below are for illustration only):

The UE capability:

Number of antennas, e.g., as shown in Table 1.

Device bandwidth, e.g., as shown in Table 2 for FR1.

TABLE 1

| Number of UE receiving antennas | Amount of coverage recovery allowed |
| --- | --- |
| 4 Rx | 0 dB |
| 2 Rx | 3 dB |
| 1 Rx | 6 dB |

TABLE 2

| Max UE bandwidth | Amount of coverage recovery allowed |
| --- | --- |
| 100 MHZ | 0 dB |
| 50 MHz | 3 dB |
| 20 MHz | 6 dB |

The UE type, e.g. a RedCap UE category or set of UE capabilities. An example is shown in Table 3.

TABLE 3

| UE type | Amount of coverage recovery allowed |
| --- | --- |
| Non-RedCap | 0 dB |
| RedCap type 1 | 3 dB |
| RedCap type 2 | 6 dB |

Part of UE subscription information

For example the amount of coverage recovery allowed for the UE can be configured by the network operator or the network and included as part of the UE subscription information. A new information element (IE) containing or indicating the amount of coverage recovery can be retrieved using the UE's SPID (subscription profile identification). In this way the amount of coverage recovery could be configured specifically for each UE.

Implicit Configuration

Figure 3:
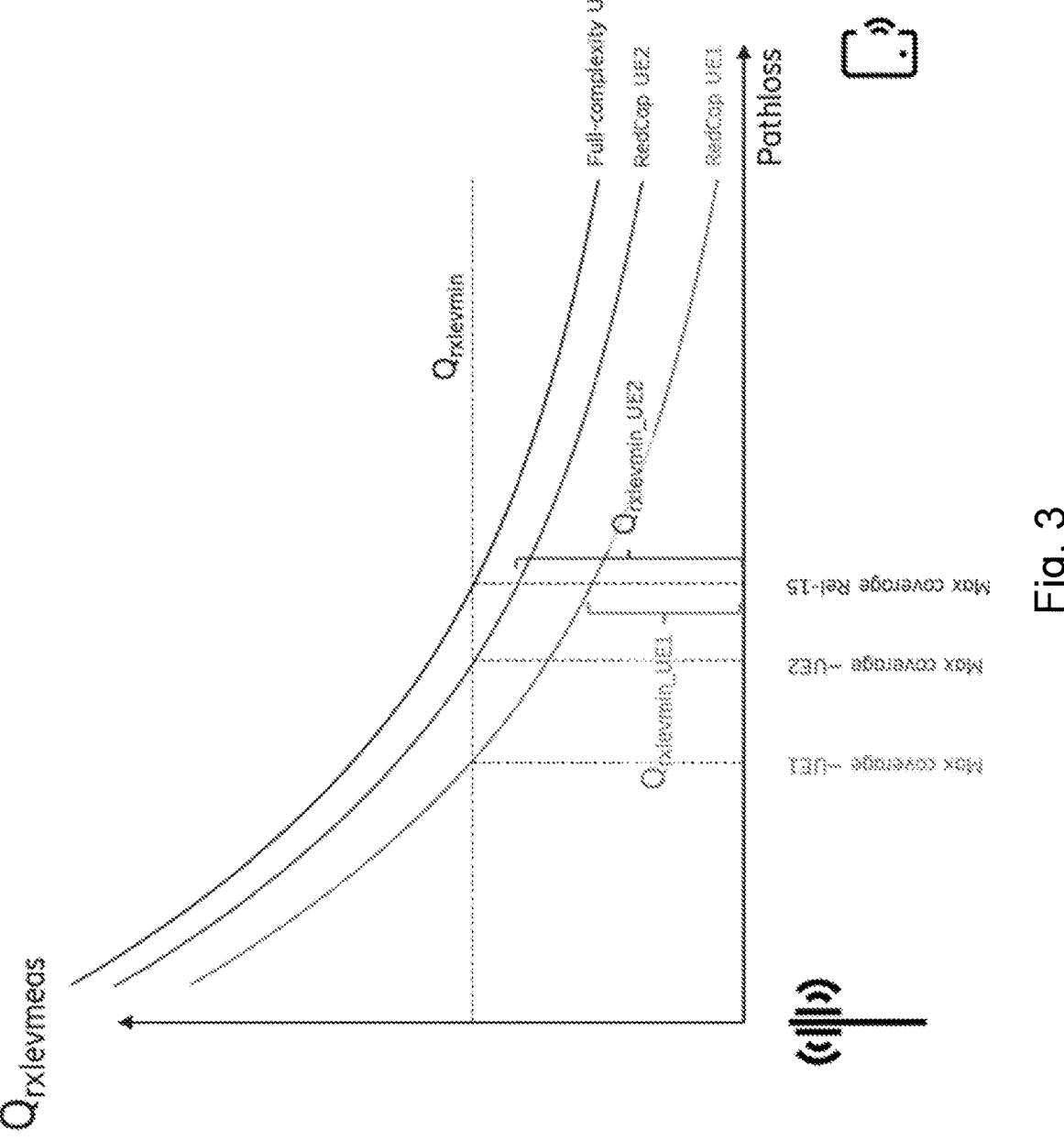
FIG. 3 illustrates implicit coverage recovery to restore coverage to the Rel-15 limit.

In a third set of embodiments of the techniques presented herein (which can be implemented in combination with, or separately from, the first and/or second set of embodiments described above), the amount of coverage recovery can be implicitly configured for a particular UE. The purpose of coverage recovery is to compensate for the performance loss due to a reduction in the complexity of a UE. This is to ensure that low-complexity UEs, like RedCap UEs, have Rel-15 coverage (i.e. the same coverage as envisaged according to the Rel-15 standards) and accordingly experience the same cell size. In these embodiments, the amount of coverage recovery can be implicitly configured and determined by the amount of performance loss due the reduction in UE complexity. For example, if a RedCap UE has 3 dB performance loss in RSRP compared to a full-complexity 'reference' UE, the value of $Q_{rxlevmin\_RedCap}$ could set to be 3 dB lower than the value of $Q_{rxlevmin}$. Here, 'loss in RSRP' could be defined as the difference between the measured RSRPs by the reduced complexity UE and the full-complexity UE when they are co-located and measuring the same signal under the same circumstances. FIG. 3 illustrates implicit coverage recovery to restore coverage to the Rel-15 limit. FIG. 3 shows $Q_{rxlevmeas}$ for three different UEs: a full complexity UE, a first RedCap UE (RedCap UE1), and a second RedCap UE (RedCap UE2), and shows the amount of coverage that each UE would have when using $Q_{rxlevmin}$ (with the coverage for the full complexity UE with $Q_{rxlevmin}$ being considered the maximum Rel-15 coverage). It can be seen that RedCap UE2 has a higher performance loss compared to RedCap UE1, and so RedCap UE2 will require a lower $Q_{rxlevmin\_RedCap}$ threshold than RedCap UE1 (although RedCap UE1 requires a $Q_{rxlevmin\_RedCap}$ that is lower than $Q_{rxlevmin}$) to ensure coverage compensation/recovery up to Rel-15 coverage. The lull-complexity reference UE' could be the least capable UE according to Rel-15 specification.

The implicit configuration of $Q_{qualmin\_RedCap}$ can, in a similar way, be based on the RSRQ loss associated with the reduction in complexity of the UE.

Indication in System Information

In some embodiments, it can be indicated if coverage recovery is allowed to be used in a particular cell or not. That is, even if a UE would be allowed a certain amount of coverage recovery according to the previous embodiments, the UE would, for example, need to check a flag in system information (SI) broadcast to see if coverage recovery is allowed in the particular cell. In this case, the different coverage levels described above with reference to the 'explicit configuration' embodiments above may be hard coded (i.e. defined) in the specification(s). In other cases, the exact amount of coverage recovery (e.g. 0 dB, 3 dB, 6 dB) may be given in system information (SI).

In some cases, the network operator may want to compensate the coverage loss fully (i.e. up to Rel-15 NR coverage) to have full service coverage for certain types of UE, e.g. smartwatches that only have 1 Rx antenna. In other cases, it may be more important that there is no negative network impact to ensure the performance of other UEs, e.g. MBB UEs. In the latter case the indication included in system information could be a fraction (e.g. a 'Coverage to Recovery factor') rather than a binary flag. In this case the overall coverage compensation allowed for a UE could be determined both from the amount, as determined by the previous embodiments, and the 'fraction' indicated in system information. For example, if the UE has a 6 dB performance loss due to its low complexity, and would therefore require $Q_{rxlevmin\_RedCap}$ to be 6 dB lower than $Q_{rxlevmin}$ for full coverage recovery, but the network operator or network only wants to compensate some of the coverage to avoid a negative impact on system performance, then a Coverage Recovery factor of 0.5 can be configured (e.g. signalled in system information). This means that the UE should apply a $Q_{rxlevmin\_RedCap}$ which is 6 dB*0.5=3 dB lower than $Q_{rxlevmin}$ in the cell.

In some cases, the parameters governing the coverage recovery e.g. some of $Q_{rxlevmin}$, $Q_{rxlevmin\_RedCapOffset}$, $Q_{qualmin}$ and/or $Q_{qualmin\_RedCapOffset}$ could be given by dedicated RRC signalling for the UE. This could be useful in cases where some particular UE(s) should have a specific treatment or behaviour, different from the other UEs in the cell.

Figure 4:
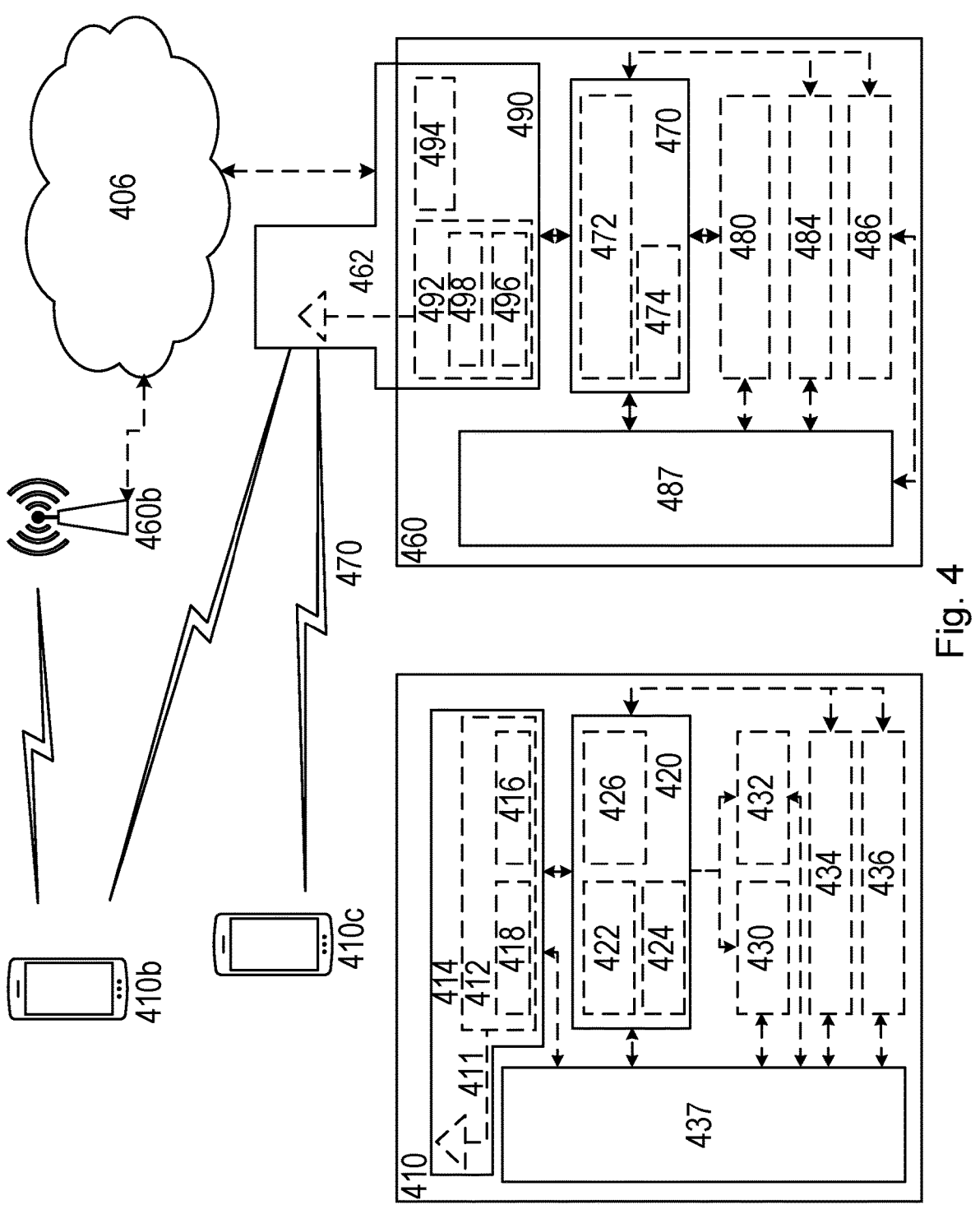
FIG. 4 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long to Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include to multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may to be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 492 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 412 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment

432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
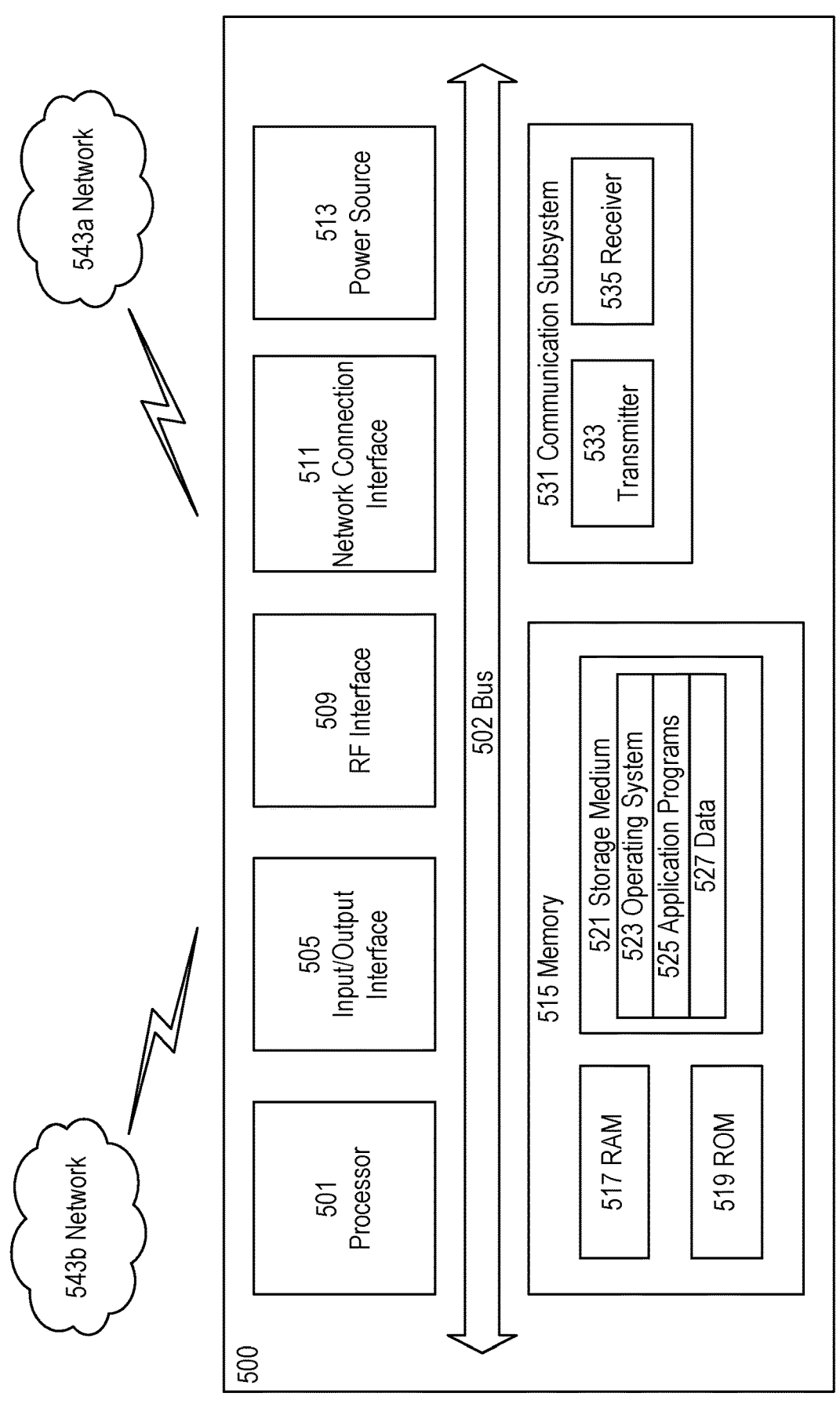
FIG. 5 shows a User Equipment in accordance with some embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3rd Generation Partnership Project (3GPP), including a NB-IoT UE, a machine type communication (MTC) UE, an enhanced MTC (eMTC) UE, and/or a UE with reduced capabilities (a RedCap UE). UE 500, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
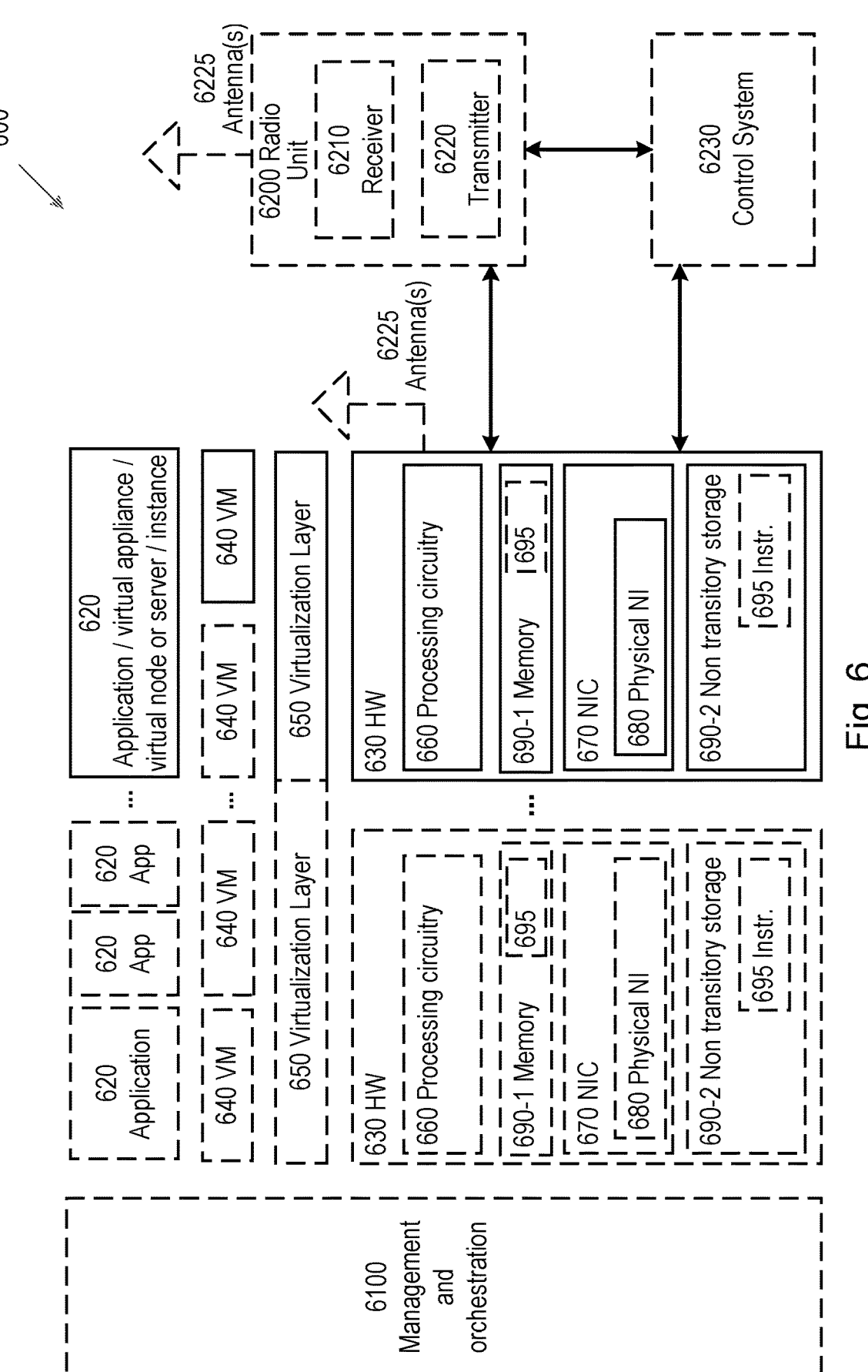
FIG. 6 shows a virtualization environment in accordance with some embodiments.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or to instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling to specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
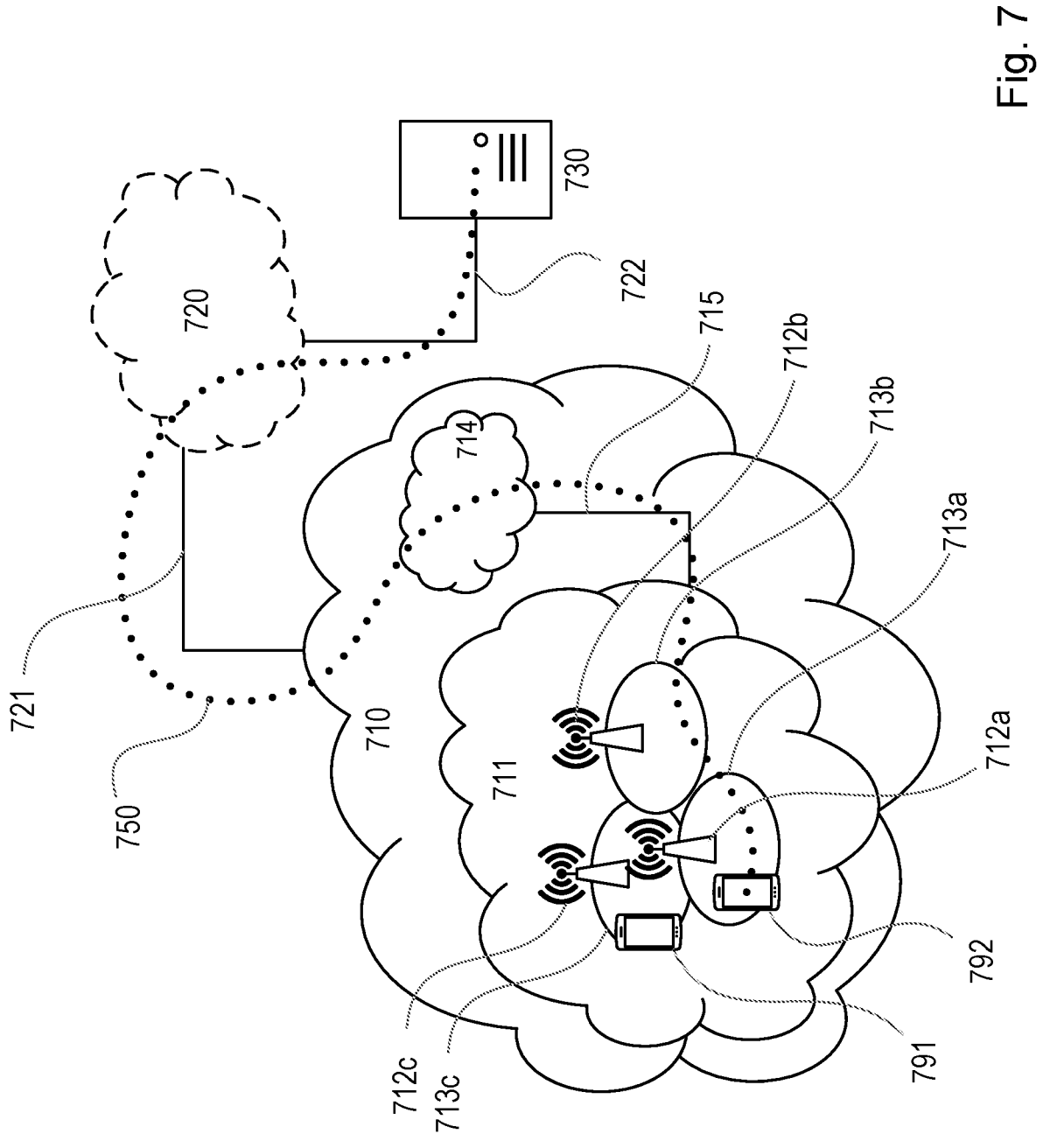
FIG. 7 shows a telecommunication network connected via an intermediate network to a host computer in accordance with some embodiments.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signalling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station

712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

Figure 8:
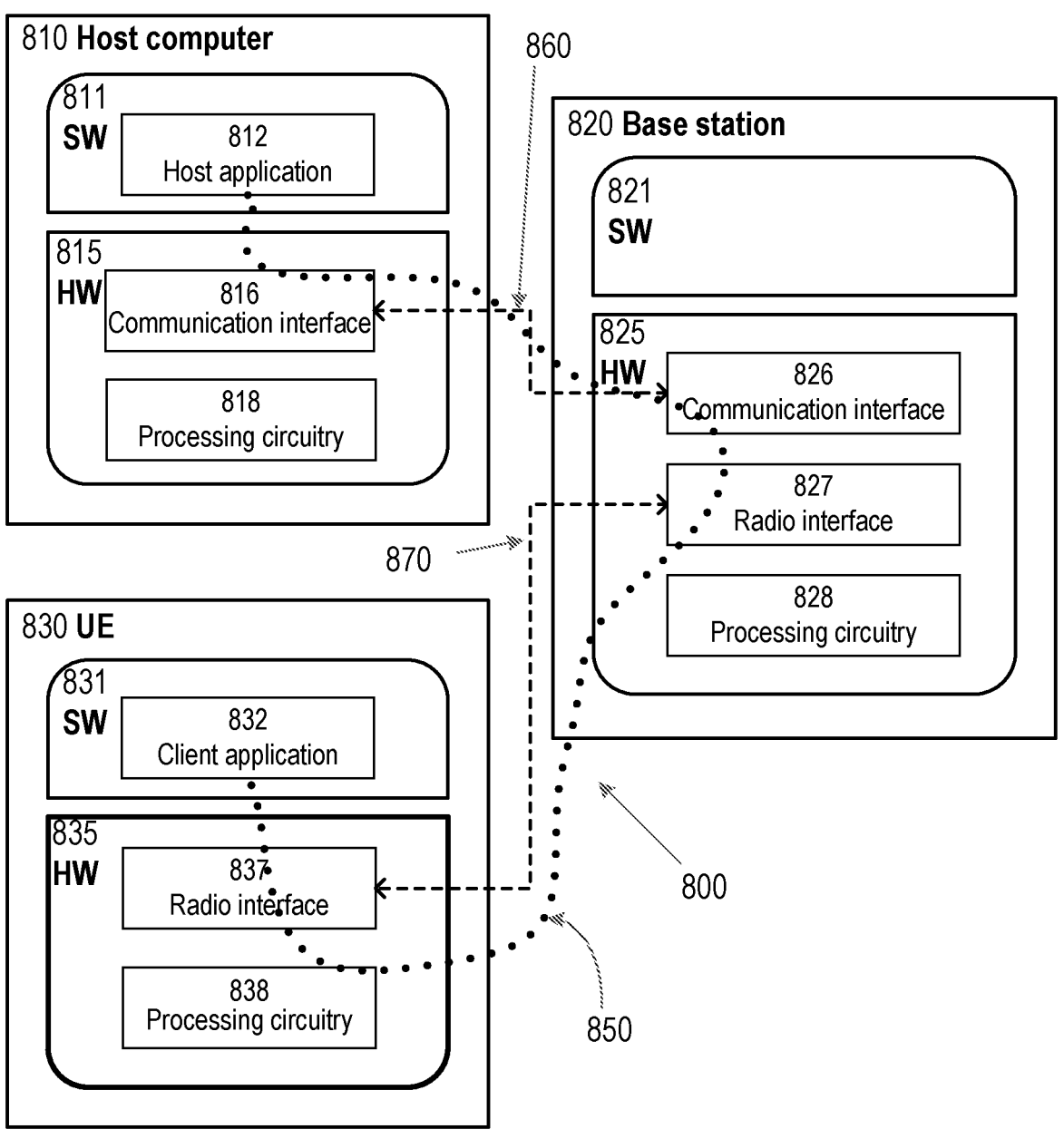
FIG. 8 shows a host computer communicating via a base station with a user equipment over a partially wireless connection in accordance with some embodiments.

It is noted that host computer 810, base station 820 and UE 830 illustrated in FIG. 8 may be similar or identical to host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the coverage available to a RedCap UE and thereby provide benefits such as more reliable connectivity to the network, reduced user waiting time (in the event that coverage reduction would have meant that coverage would otherwise not have been available).

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signalling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
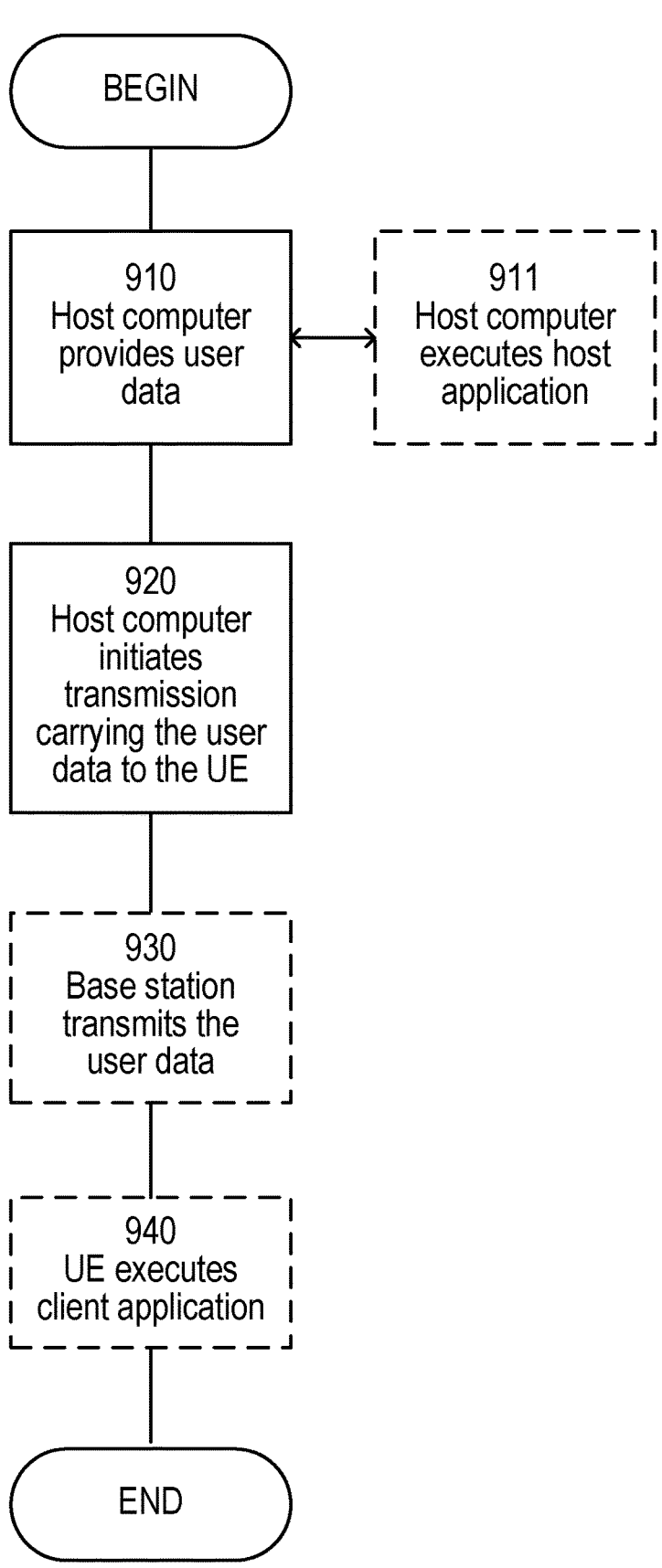
FIG. 9 is a flow chart showing methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
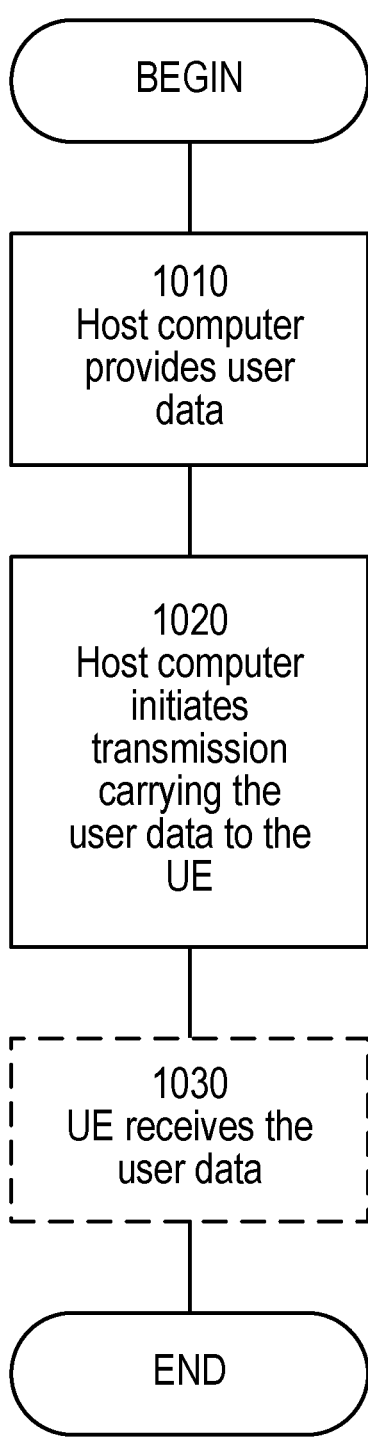
FIG. 10 is a flow chart showing methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
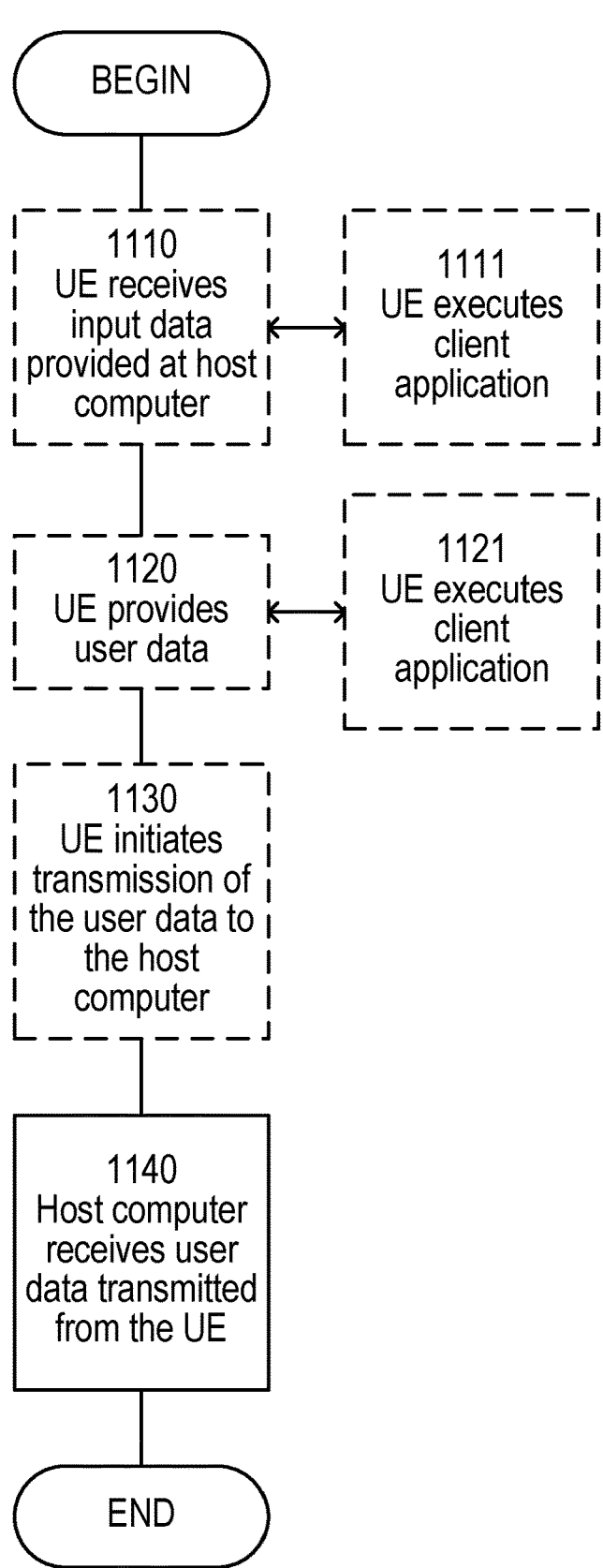
FIG. 11 is a flow chart showing methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
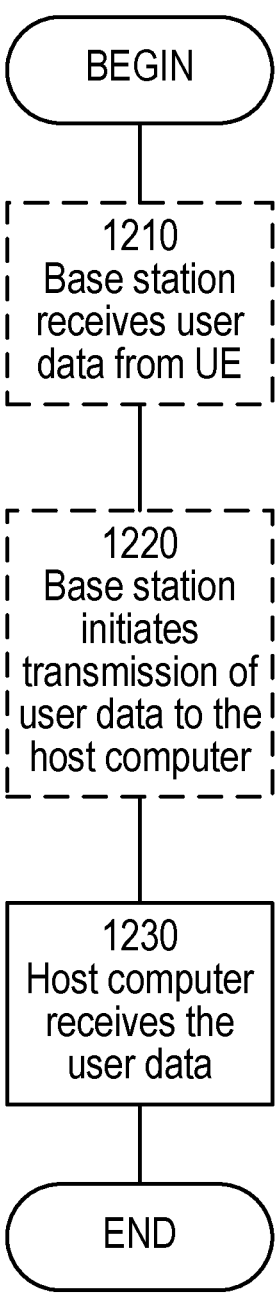
FIG. 12 is a flow chart showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

FIG. 13 depicts a method performed by a first wireless device in accordance with particular embodiments. The method begins at step 1302 in which the first wireless device evaluates a cell selection criterion to select a cell for use by the first wireless device. The cell selection criterion evaluated by the first wireless device provides for a RedCap threshold value and/or a RedCap threshold offset so that coverage recovery is enabled or provided for RedCap wireless devices. As noted above, a RedCap wireless device is a wireless device that has reduced capability.

FIG. 14 depicts a method performed by a first base station in accordance with particular embodiments. In the method the base station controls coverage recovery in a first cell. The method begins at step 1402 in which the first base station provides a RedCap threshold value and/or a RedCap threshold offset for providing coverage recovery for RedCap wireless devices that are evaluating a cell selection criterion. As noted above, a RedCap wireless device is a wireless device that has reduced capability.

Figure 15:
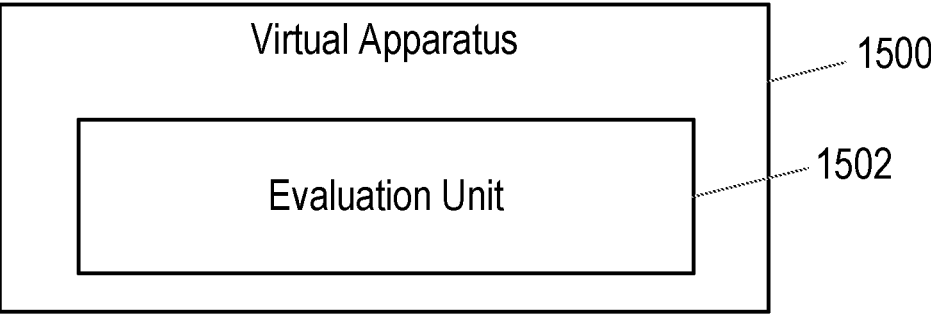
FIG. 15 shows a virtualization apparatus in accordance with some embodiments.

FIG. 15 illustrates a schematic block diagram of an apparatus 1500 in a wireless network (for example, the wireless network shown in FIG. 4). The apparatus may be implemented in a wireless device (e.g., wireless device 410 shown in FIG. 4). Apparatus 1500 is operable to carry out the example method described with reference to FIG. 13 and possibly any other processes or methods disclosed herein. It is also to be understood that the method of FIG. 13 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the evaluation unit 1502, and any other suitable units of apparatus 1500 to perform corresponding functions according one or more embodiments of the present disclosure.

As illustrated in FIG. 15, apparatus 1500 includes an evaluation unit 1502 that is configured to evaluate a cell selection criterion to select a cell for use by the first wireless device. The cell selection criterion evaluated by the evaluation unit 1502 provides for a RedCap threshold value and/or a RedCap threshold offset so that coverage recovery is enabled or provided for RedCap wireless devices.

Figure 16:
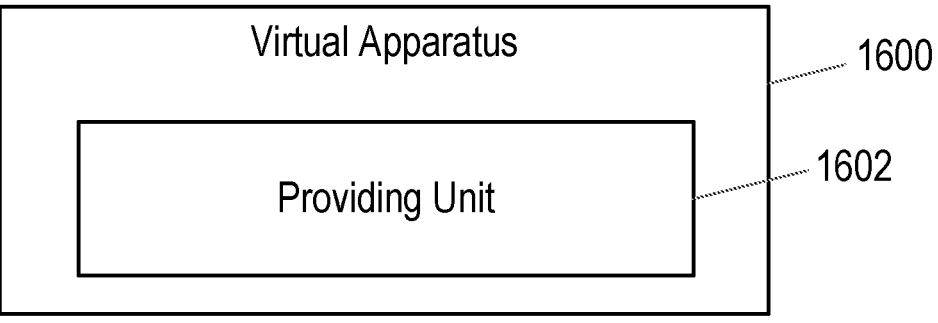
FIG. 16 shows a virtualization apparatus in accordance with some embodiments.

FIG. 16 illustrates a schematic block diagram of an apparatus 1600 in a wireless network (for example, the wireless network shown in FIG. 4). The apparatus may be implemented in a network node or base station (e.g. network node 460 shown in FIG. 4). Apparatus 1600 is operable to carry out the example method described with reference to FIG. 14 and possibly any other processes or methods disclosed herein. It is also to be understood that the method of FIG. 14 is not necessarily carried out solely by apparatus

1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the evaluation unit 1602, and any other suitable units of apparatus 1600 to perform corresponding functions according one or more embodiments of the present disclosure.

As illustrated in FIG. 16, apparatus 1600 includes a providing unit 1602 that is configured to provide a RedCap threshold value and/or a RedCap threshold offset for providing coverage recovery for RedCap wireless devices that are evaluating a cell selection criterion.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a first wireless device for cell selection, the method comprising:
   evaluating a cell selection criterion to select a cell for use by the first wireless device, wherein the cell selection criterion provides for a RedCap threshold value and/or a RedCap threshold offset for providing coverage recovery for RedCap wireless devices, wherein a RedCap wireless device is a wireless device that has reduced capability.
2. The method of embodiment 1, wherein the first wireless device is a RedCap wireless device, and wherein the step of evaluating the cell selection criterion comprises using a RedCap threshold value and/or a RedCap threshold offset to evaluate the cell selection criterion.
3. The method of embodiment 1 or 2, wherein the cell selection criterion provides for a non-RedCap threshold value to be used by non-RedCap wireless devices, wherein non-RedCap wireless devices are wireless devices that do not have reduced capability.
4. The method of embodiment 3, wherein the cell selection criterion provides for a RedCap threshold value and a non-RedCap threshold value, and wherein the RedCap threshold value is different to the non-RedCap threshold value.
5. The method of embodiment 3, wherein the cell selection criterion provides for a RedCap threshold offset and a non-RedCap threshold value, and wherein the RedCap threshold offset is non-zero.

6. The method of any of embodiments 1-5, the method further comprising:

determining if the first wireless device is a RedCap wireless device.

7. The method of any of embodiments 1-6, the method further comprising:

determining if the first wireless device is to use the RedCap threshold value and/or the RedCap threshold offset when evaluating the cell selection criterion.

8. The method of embodiment 7, wherein the step of determining if the first wireless device is to use the RedCap threshold value and/or the RedCap threshold offset when evaluating the cell selection criterion comprises determining if system information broadcast by a base station associated with a first cell indicates that coverage recovery is permitted for the first cell.

9. The method of embodiment 7 or 8, wherein the step of determining comprises determining an amount of coverage recovery permitted for the first cell based on system information broadcast by a base station associated with the first cell.

10. The method of any of embodiments 1-9, the method further comprising:

receiving, from a base station associated with a first cell, a RedCap threshold value and/or a RedCap threshold offset applicable to the first cell, wherein the RedCap threshold value and/or the RedCap threshold offset is received in system information for the first cell or received in dedicated signalling to the first wireless device.

11. The method of any of embodiments 1-10, the method further comprising:

estimating an amount of coverage loss compared to a reference wireless device due to the reduced capability of the first wireless device.

12. The method of embodiment 11, the method further comprising:

determining the RedCap threshold value and/or the RedCap threshold offset based on the estimated amount of coverage loss.

13. The method of any of embodiments 1-12, wherein the first wireless device is not a RedCap wireless device, and wherein the step of evaluating the cell selection criterion comprises using a non-RedCap threshold value, and/or not using a non-RedCap threshold offset, to evaluate the cell selection criterion.

14. The method of any of embodiments 1-13, wherein a capability of a wireless device relates to any one or more of:

a number of antennas, a number of receiving antennas and/or a number of transmitting antennas of the wireless device;

a frequency bandwidth supported by the wireless device;

a type of the wireless device; and information in a subscription for the wireless device.

15. The method of any of the previous embodiments, further comprising:

providing user data; and forwarding the user data to a host computer via a transmission to a base station associated with a cell selected by the first wireless device by evaluating the cell selection criterion.

Group B Embodiments

16. A method performed by a first base station for controlling coverage recovery in a first cell, the method comprising:

providing a RedCap threshold value and/or a RedCap threshold offset for providing coverage recovery for RedCap wireless devices that are evaluating a cell selection criterion, wherein a RedCap wireless device is a wireless device that has reduced capability.

17. The method of embodiment 16, the method further comprising:

providing a non-RedCap threshold value for use by non-RedCap wireless devices in evaluating a cell selection criterion, wherein a RedCap wireless device is a wireless device that does not have reduced capability.

18. The method of embodiment 17, wherein the RedCap threshold value is different to the non-RedCap threshold value.

19. The method of embodiment 17 or 18, wherein the RedCap threshold offset is non-zero.

20. The method of any of embodiments 16-19, the method further comprising:

determining if a first wireless device is a RedCap wireless device.

21. The method of any of embodiments 16-20, the method further comprising:

determining if a first wireless device is to use the RedCap threshold value and/or the RedCap threshold offset when evaluating the cell selection criterion.

22. The method of any of embodiments 16-21, the method further comprising:

broadcasting system information for the first cell that indicates whether coverage recovery is permitted for the first cell.

23. The method of any of embodiments 16-22, the method further comprising:

broadcasting system information for the first cell that indicates an amount of coverage recovery permitted for the first cell.

24. The method of any of embodiments 1-9, the method further comprising:

sending, to a first wireless device, a RedCap threshold value and/or a RedCap threshold offset applicable to the first cell.

25. The method of embodiment 24, wherein the RedCap threshold value and/or the RedCap threshold offset are sent to the first wireless device in system information, in dedicated signalling to the first wireless device.

26. The method of any of embodiments 16-25, the method further comprising:

estimating an amount of coverage loss compared to a reference wireless device due to the reduced capability of a first wireless device.

27. The method of embodiment 26, the method further comprising:

determining the RedCap threshold value and/or the RedCap threshold offset for the first wireless device based on the estimated amount of coverage loss.

28. The method of any of embodiments 16-25, wherein a capability of a wireless device relates to any one or more of:

a number of antennas, a number of receiving antennas and/or a number of transmitting antennas of the wireless device;

a frequency bandwidth supported by the wireless device;

a type of the wireless device; and information in a subscription for the wireless device.

29. The method of any of the previous embodiments, further comprising:
obtaining user data; and
forwarding the user data to a host computer or a wireless device.

Group C Embodiments

30. A wireless device, the wireless device comprising:
processing circuitry configured to perform any of the steps of any of the Group A embodiments; and
power supply circuitry configured to supply power to the wireless device.
31. A base station for controlling coverage recovery in a first cell, the base station comprising:
processing circuitry configured to perform any of the steps of any of the Group B embodiments;
power supply circuitry configured to supply power to the base station.
32. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
33. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
34. The communication system of the previous embodiment further including the base station.
35. The communication system of the previous 2 embodiments, further including the UE, wherein the UE is configured to communicate with the base station.
36. The communication system of the previous 3 embodiments, wherein:
the processing circuitry of the host computer is configured to execute a host application, thereby providing the user data; and
the UE comprises processing circuitry configured to execute a client application associated with the host application.
37. A method implemented in a communication system including a host computer, a base station and a user equipment (UE), the method comprising:

at the host computer, providing user data; and
at the host computer, initiating a transmission carrying the user data to the UE via a cellular network comprising the base station, wherein the base station performs any of the steps of any of the Group B embodiments.
38. The method of the previous embodiment, further comprising, at the base station, transmitting the user data.
39. The method of the previous 2 embodiments, wherein the user data is provided at the host computer by executing a host application, the method further comprising, at the UE, executing a client application associated with the host application.
40. A user equipment (UE) configured to communicate with a base station, the UE comprising a radio interface and processing circuitry configured to performs any of the previous 3 embodiments.
41. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
42. The communication system of the previous embodiment, wherein the cellular network further includes a base station configured to communicate with the UE.
43. The communication system of the previous 2 embodiments, wherein:
the processing circuitry of the host computer is configured to execute a host application, thereby providing the user data; and
the UE's processing circuitry is configured to execute a client application associated with the host application.
44. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
45. The method of the previous embodiment, further comprising at the UE, receiving the user data from the base station.
46. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
47. The communication system of the previous embodiment, further including the UE.
48. The communication system of the previous 2 embodiments, further including the base station, wherein the base station comprises a radio interface configured to communicate with the UE and a communication interface configured to forward to the host computer the user data carried by a transmission from the UE to the base station.

49. The communication system of the previous 3 embodiments, wherein:

the processing circuitry of the host computer is configured to execute a host application; and the UE's processing circuitry is configured to execute a client application associated with the host application, thereby providing the user data.

50. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

51. A method implemented in a communication system including a host computer, a base station and a user equipment (UE), the method comprising:

at the host computer, receiving user data transmitted to the base station from the UE, wherein the UE performs any of the steps of any of the Group A embodiments.

52. The method of the previous embodiment, further comprising, at the UE, providing the user data to the base station.

53. The method of the previous 2 embodiments, further comprising:

at the UE, executing a client application, thereby providing the user data to be transmitted; and at the host computer, executing a host application associated with the client application.

54. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

55. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

56. The communication system of the previous embodiment further including the base station.

57. The communication system of the previous 2 embodiments, further including the UE, wherein the UE is configured to communicate with the base station.

58. The communication system of the previous 3 embodiments, wherein:

the processing circuitry of the host computer is configured to execute a host application;

the UE is configured to execute a client application associated with the host application, thereby providing the user data to be received by the host computer.

59. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

60. The method of the previous embodiment, further comprising at the base station, receiving the user data from the UE.

61. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| 1 × RTT | CDMA2000 1 × Radio Transmission Technology |
| 3GPP | 3rd Generation Partnership Project |
| 4G | $4^{th}$ Generation |
| 5G | 5th Generation |
| 5GC | 5G Core |
| 5GS | 5G System |
| ABS | Almost Blank Subframe |
| AMF 760 | Access and Mobility management Function |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CN | Core Network |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |

-continued

| | |
|---|---|
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| IMEI | International Mobile Equipment Identity |
| LOS | Line of Sight |
| LPP | LTE Positioning Protocol |
| LTE | Long-Term Evolution |
| MAC | Medium Access Control |
| MBB | Mobile BroadBand |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| MT | Mobile Terminated |
| MTC | Machine-Type Communication |
| NG | The interface/reference point between the RAN and the CN in 5G/NR |
| NG-C | The control plane part of NG (between a gNB and an AMF) |
| NG-RAN | Next Generation RAN |
| NG-U | The user plane part of NG (between a gNB and a UPF) |
| NPDCCH | Narrowband Physical Downlink Control Channel |
| NR | New Radio |
| NSSAI | Network Slice Selection Assistance Information |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |

-continued

| | |
|---|---|
| PUSCH | Physical Uplink Shared Channel |
| RACH | Random Access Channel |
| QAM | Quadrature Amplitude Modulation |
| RAN | Radio Access Network |
| RAT | Radio Access Technology |
| RFSP Index | RAT/Frequency Selection Priority Index |
| RLC | Radio Link Control |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| S-NSSAI | Selected NSSAI |
| SON | Self Optimized Network |
| SN | Sequence Number |
| SPID | Subscriber Profile ID for RAT/Frequency Priority |
| SS | Synchronization Signal |
| SSS | Secondary Synchronization Signal |
| TA | Tracking Area |
| TDD | Time Division Duplex |
| TDOA | Time Difference of Arrival |
| TOA | Time of Arrival |
| TS | Technical Specification |
| TSS | Tertiary Synchronization Signal |
| TTI | Transmission Time Interval |
| UDM | Unified Data Management |
| UE | User Equipment |
| UL | Uplink |
| UMTS | Universal Mobile Telecommunication System |
| UPF | User Plane Function |
| URLLC | Ultra-Reliable Low-Latency Communication |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |
| Xn | The interface/reference point between two gNBs |

The invention claimed is:

1. A method performed by a first wireless device for cell selection, the method comprising:

receiving, from a base station associated with a first cell, a RedCap threshold offset applicable to the first cell, wherein the RedCap threshold offset is received in system information for the first cell or received in dedicated signalling to the first wireless device; and evaluating a cell selection criterion to select a cell for use by the first wireless device, wherein the cell selection criterion provides RedCap threshold offset for providing coverage recovery for RedCap wireless devices, wherein a RedCap wireless device is a wireless device that has reduced capability which causes the wireless device to have reduced coverage.

2. The method of claim 1, wherein the first wireless device is a RedCap wireless device, and wherein the step of evaluating the cell selection criterion comprises using the RedCap threshold offset applicable to the first cell to evaluate the cell selection criterion.

3. The method of claim 1, wherein the cell selection criterion provides a non-RedCap threshold value to be used by non-RedCap wireless devices, wherein non-RedCap wireless devices are wireless devices that do not have reduced capability.

4. The method of claim 3, wherein the cell selection criterion provides a RedCap threshold value and a non-RedCap threshold value, and wherein the RedCap threshold value is different to the non-RedCap threshold value.

5. The method of claim 3, wherein the cell selection criterion provides a RedCap threshold offset and a non-RedCap threshold value, and wherein the RedCap threshold offset is non-zero.

6. The method of claim 1, the method further comprising: determining whether the first wireless device is to use the RedCap threshold offset when evaluating the cell selection criterion.

7. The method of claim 6, wherein the step of determining if the first wireless device is to use the RedCap threshold offset when evaluating the cell selection criterion comprises determining whether system information broadcast by a base station associated with a first cell indicates that coverage recovery is permitted for the first cell.

8. The method of claim 6, wherein the step of determining comprises determining an amount of coverage recovery permitted for the first cell based on system information broadcast by a base station associated with the first cell.

9. The method of claim 1, the method further comprising: estimating an amount of coverage loss compared to a reference wireless device due to the reduced capability of the first wireless device and determining the RedCap threshold offset based on the estimated amount of coverage loss.

10. The method of claim 1, wherein the first wireless device is not a RedCap wireless device, and wherein the step of evaluating the cell selection criterion comprises using a non-RedCap threshold value, and/or not using a non-RedCap threshold offset, to evaluate the cell selection criterion.

11. The method of claim 1, wherein a capability of a wireless device relates to any one or more of:

a number of antennas, a number of receiving antennas and/or a number of transmitting antennas of the wireless device;

a frequency bandwidth supported by the wireless device;

a type of the wireless device; and information in a subscription for the wireless device.

12. A method performed by a first base station for controlling coverage recovery in a first cell associated with the first base station, the method comprising:

providing a RedCap threshold offset for providing coverage recovery for RedCap wireless devices that are evaluating a cell selection criterion, wherein a RedCap wireless device is a wireless device that has reduced capability which causes the wireless device to have reduced coverage and wherein said providing comprises sending to a first wireless device, a RedCap threshold offset applicable to the first cell, wherein the the RedCap threshold offset is sent in system information for the first cell or sent in dedicated signalling to the first wireless device.

13. The method of claim 12, the method further comprising:

providing a non-RedCap threshold value for use by non-RedCap wireless devices in evaluating a cell selection criterion, wherein a non-RedCap wireless device is a wireless device that does not have reduced capability.

14. The method of claim 12, the method further comprising:

broadcasting system information for the first cell that indicates whether coverage recovery is permitted for the first cell and/or an amount of coverage recovery permitted for the first cell.

15. The method of claim 12, the method further comprising:

estimating an amount of coverage loss compared to a reference wireless device due to the reduced capability of a first wireless device and determining the RedCap threshold offset for the first wireless device based on the estimated amount of coverage loss.

16. A first wireless device configured to perform cell selection, the first wireless device comprising a processor and a memory, said memory containing instructions executable by said processor whereby said first wireless device is operative to:

receive, from a base station associated with a first cell, RedCap threshold offset applicable to the first cell, wherein the RedCap threshold offset is received in system information for the first cell or received in dedicated signalling to the first wireless device; and evaluate a cell selection criterion to select a cell for use by the first wireless device, wherein the cell selection criterion provides RedCap threshold offset for providing coverage recovery for RedCap wireless devices, wherein a RedCap wireless device is a wireless device that has reduced capability which causes the wireless device to have reduced coverage.

17. The first wireless device of claim 16, wherein the first wireless device is a RedCap wireless device, and wherein the first wireless device is operative to use the RedCap threshold offset applicable to the first cell to evaluate the cell selection criterion.

18. A first base station configured to control coverage recovery in a first cell associated with the first base station, the first base station comprising a processor and a memory, said memory containing instructions executable by said processor whereby said first base station is operative to:

provide a RedCap threshold offset for providing coverage recovery for RedCap wireless devices that are evaluating a cell selection criterion, wherein a RedCap wireless device is a wireless device that has reduced capability which causes the wireless device to have reduced coverage and wherein said providing comprises sending to a first wireless device, a RedCap threshold offset applicable to the first cell, wherein the RedCap threshold offset is sent in system information for the first cell or sent in dedicated signalling to the first wireless device.

* * * * *